(12) United States Patent
Kim et al.

(10) Patent No.: US 12,009,510 B1
(45) Date of Patent: Jun. 11, 2024

(54) FAST-CHARGE LITHIUM METAL PHOSPHATE MATERIALS

(71) Applicant: Rivian IP Holdings, LLC, Irvine, CA (US)

(72) Inventors: Soo Kim, Fremont, CA (US); Sun Ung Kim, Pleasanton, CA (US); Rubayyat Mahbub, Fremont, CA (US); Woochul Shin, Newark, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/346,112

(22) Filed: Jun. 30, 2023

(51) Int. Cl.
*H01M 4/36* (2006.01)
*H01M 4/136* (2010.01)
*H01M 4/58* (2010.01)
*H01M 4/62* (2006.01)
*H01M 4/02* (2006.01)

(52) U.S. Cl.
CPC ........... *H01M 4/366* (2013.01); *H01M 4/136* (2013.01); *H01M 4/5825* (2013.01); *H01M 4/625* (2013.01); *H01M 2004/021* (2013.01); *H01M 2004/028* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2011/0168550 A1* | 7/2011 | Wang | H01M 4/131 204/290.01 |
| 2014/0106225 A1* | 4/2014 | Matsuno | H01M 4/485 429/221 |
| 2022/0393147 A1* | 12/2022 | Takada | H01M 16/00 |

OTHER PUBLICATIONS

Sendek, et al., "Holistic computational structure screening of more than 12000 candidates for solid lithium-ion conductor materials," Energy & Environmental Science, Dec. 2016, 15 pages.

* cited by examiner

*Primary Examiner* — Wyatt P McConnell
(74) *Attorney, Agent, or Firm* — BAKERHOSTETLER

(57) ABSTRACT

Aspects of the disclosure relate to electrode active materials for use in battery cells that include a lithium metal phosphate core having a more ionically conductive layer thereon. The layer of the ionic conducting material advantageously can increase lithium ion conduction of the active material by at least one order of magnitude relative to the core material alone. As such, electrodes may be fabricated with lower areal densities resulting in battery cells that have such electrodes with higher charge rates and potentially smaller physical dimensions.

20 Claims, 10 Drawing Sheets

FAST-CHARGE LITHIUM METAL PHOSPHATE MATERIALS

INTRODUCTION

The present disclosure generally relates to electrode active materials for use in battery cells. Battery cells are often used to store and discharge electrical energy.

Aspects of the subject technology can help improve the operation and implementation of battery cells. For example, battery cells having active materials of the present disclosure can reduce charge times, enhance efficiency and utilization of batteries, which can help to mitigate climate change by reducing and/or preventing additional greenhouse gas emissions.

SUMMARY

The present disclosure generally relates to active materials, e.g., cathode active materials, that include a lithium metal phosphate (LMP) core material having a more ionically conductive layer thereon. For example, the ionic conductivity of lithium ions of the ionic conducting material may be at least one order of magnitude greater, e.g., at least 2, 3, 4, or 5 orders of magnitude greater, than the ionic conductivity of lithium ions of the LMP core material.

In some aspects, the LMP core material may be in the form of a particle with a layer of the ionic conducting material on at least a portion on the particle, and in other aspects the LMP core material may be in the form of a layer on a current collector and the ionic conducting material on at least a portion of such LMP layer. In further aspects, the active materials can include a conductive carbon material on a surface thereof or between the LMP core material and the layer of the ionic conducting material.

In accordance with one or more aspects of the disclosure, the LMP core material includes $LiMPO_4$, wherein M is iron (Fe), manganese (Mn) or a combination of Fe and Mn. For example, the LMP core material can include materials of $LiFe_{1-x}M_xPO_4$, where $0 \leq x \leq 1$, e.g., $0.5 \leq x \leq 1$, and M comprises one or more of manganese (Mn), nickel (Ni), Aluminum (Al), cobalt (Co), magnesium (Mg), zinc (Zn), or titanium (Ti), etc.

In accordance with one or more aspects of the disclosure, the ionic conducting material can include one or more compounds of formula: $Li_a\text{-}M'_b\text{-}P_c\text{—}O_d\text{—}(F)_e$, wherein M' is V, Cr, Mn, Fe, Co, Cu, Bi or VCr, Mo, VCr, VMn, VFe, Ti, or W; $0<a\leq 11$, e.g., $1\leq a\leq 11$, $1\leq b\leq 8$, $1\leq c\leq 12$, $4\leq d\leq 48$, $0\leq e\leq 2$. The ionic conducting material can have a compound that exhibits a higher, similar, or lower voltage (vs. $Li/Li^+$) than the LMP core material. For example, the ionic conducting material can include compounds of Formula (IA): $Li_a\text{-}M'_b\text{-}P_c\text{—}O_d\text{—}(F)_e$, wherein M' is V, Cr, Mn, Fe, Co, Cu, Bi or VCr; $0<a\leq 9$, e.g., $1\leq a\leq 9$, $1\leq b\leq 3$, $1\leq c\leq 8$, $4\leq d\leq 29$, and $0\leq e\leq 1$. Alternatively, or in combination, the ionic conducting material can include compounds of Formula (IB): $Li_a\text{-}M'_b\text{-}P_c\text{—}O_d\text{—}(F)_e$, wherein M' is V, Fe, Mo, VCr, VMn, VFe; $0<a\leq 11$, e.g., $1\leq a\leq 11$, $1\leq b\leq 8$, $1\leq c\leq 12$, $5\leq d\leq 48$, $0\leq e\leq 2$. Alternatively, or in combination, the ionic conducting material can include compounds of Formula (IC): $Li_a\text{-}M'_b\text{-}P_c\text{—}O_d\text{—}(F)_e$, wherein M' is V, VFe, Ti, Cr, W; $0<a\leq 3$, e.g., $1\leq a\leq 3$, $1\leq b\leq 4$, $1\leq c\leq 3$, $4\leq d\leq 12$, and $0\leq e\leq 2$.

In accordance with one or more aspects of the disclosure, an electrode can include a current collector having a first principal surface and a second principal surface in which a coating is disposed on the first principal surface and on the second principal surface of the current collector. The coating can include an active material as described herein. For example, the coating can include an active material composed of a lithium metal phosphate (LMP) core material having a layer of an ionic conducting material on at least a portion of the LMP core material. The ionic conducting material can have a higher ionic conductivity of lithium ions than the LMP core material. Further, an areal density of each coating on the first and the second principal surface of the current collector may be no more than about 15 $mg/cm^2$.

In accordance with one or more aspects of the disclosure, a battery cell can include an electrode having an active material as described herein. For example, a battery cell can include an electrode including an active material comprising a lithium metal phosphate (LMP) core material having a layer of an ionic conducting material on at least a portion of the LMP core material. The ionic conducting material can have a higher ionic conductivity of lithium ions than the LMP core material.

In one or more implementations, a battery cell having an active material as described herein may be included in a building and/or moveable apparatus, e.g., a vehicle. For example, such a battery cell may be configured to power a component or system of a building and/or a vehicle.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

As discussed in further detail hereinafter, a battery cell composed of an electrode including an active material of the present disclosure may be used to store and discharge electrical energy. A battery cell of the present disclosure can be used alone or multiple battery cells can be assembled or packaged together in the same housing, frame, or casing to form a battery subassembly, module and/or battery pack. Further, multiple battery subassemblies or modules can be assembled or packaged together to form a battery pack. The battery cells of a battery subassembly, module and/or pack can be electrically connected to generate a desired voltage output for the battery subassembly, module and/or pack. The battery subassembly, module and/or pack in turn can be electrically connected to a power-consuming component, such as a vehicle and/or an electrical system of a building.

Vehicles, Battery Packs, Cells

Figure 1A:
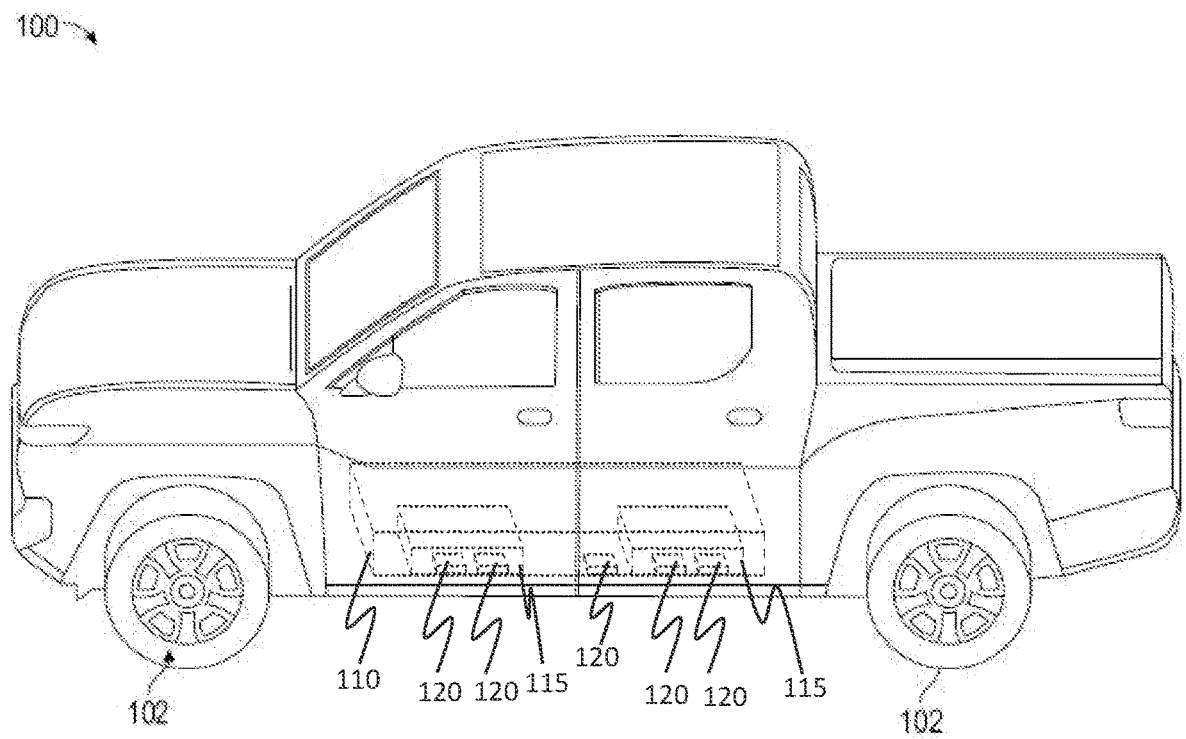
FIGS. 1A and 1B illustrate schematic perspective side views of example implementations of a vehicle having a battery pack in accordance with one or more implementations.

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically-powered engines, such as a gas-powered engine or a fuel cell powered motor. For example, electric vehicles can be fully electric or partially electric (e.g., hybrid or plug-in hybrid). In various implementations, the vehicle 100 may be a fully autonomous vehicle that can navigate roadways without a human operator or driver, a partially autonomous vehicle that can navigate some roadways without a human operator or driver or that can navigate roadways with the supervision of a human operator, may be an unmanned vehicle that can navigate roadways or other pathways without any human occupants, or may be a human operated (non-autonomous) vehicle configured for a human operator.

In the example of FIG. 1A, the vehicle 100 is implemented as a truck (e.g., a pickup truck) having a battery pack 110. As shown, the battery pack 110 may include one or more battery subassemblies (e.g., modules) 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit (e.g., a subassembly or module) can include an assembly of cells that can be combined with other elements (e.g., structural frame, thermal management devices) that can protect the assembly of cells from heat, shock and/or vibrations.

For example, the battery cell 120 can be included a battery, a battery unit, a battery subassembly, module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 1B:
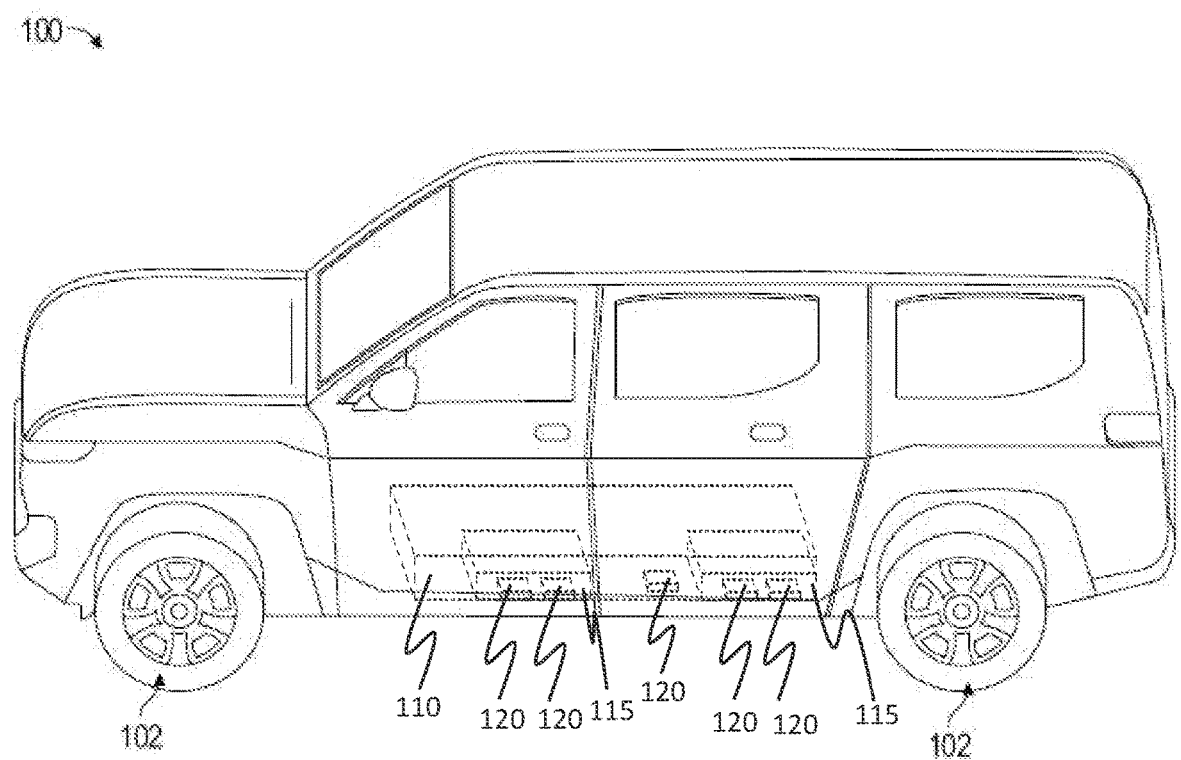

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
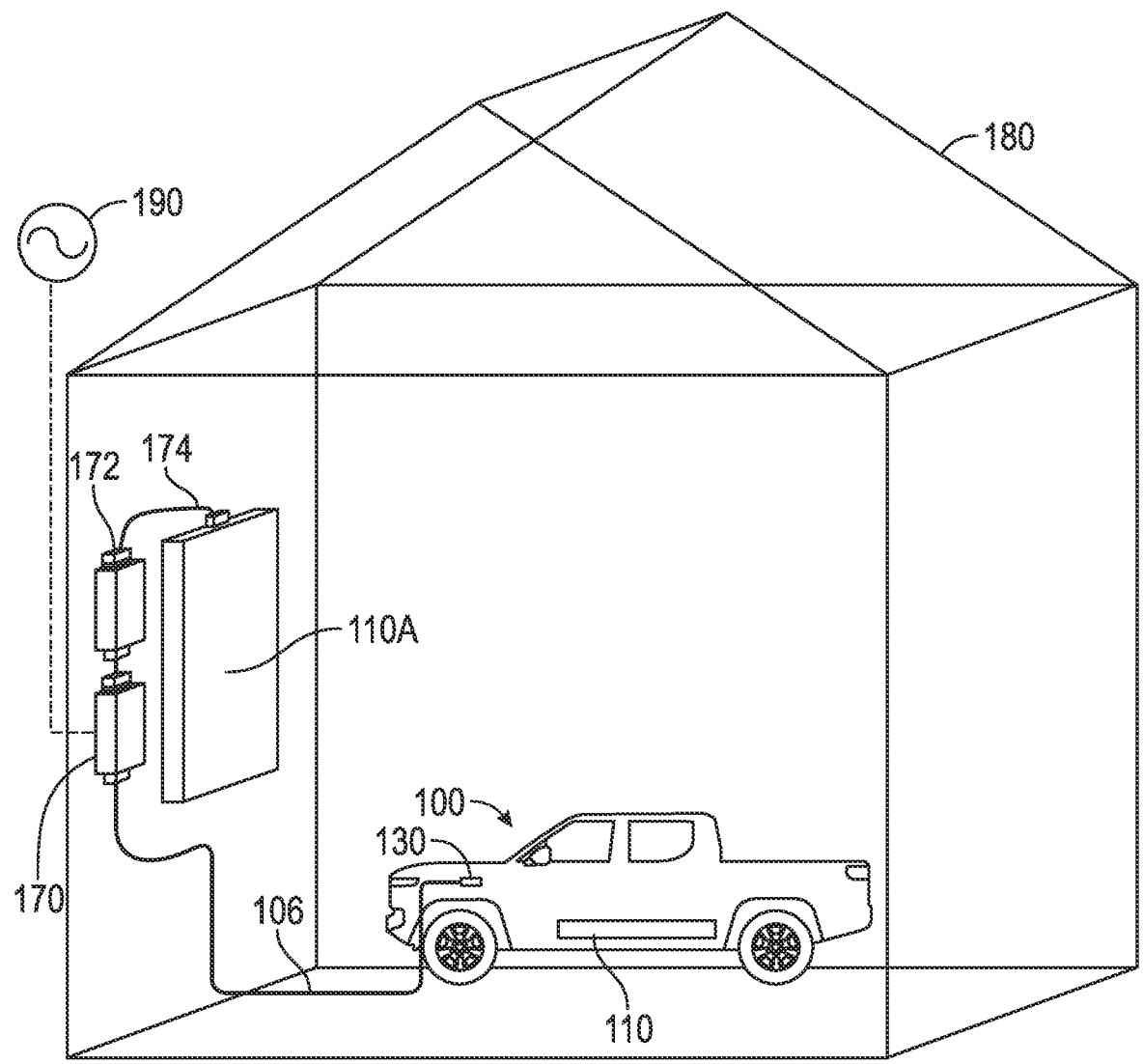
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
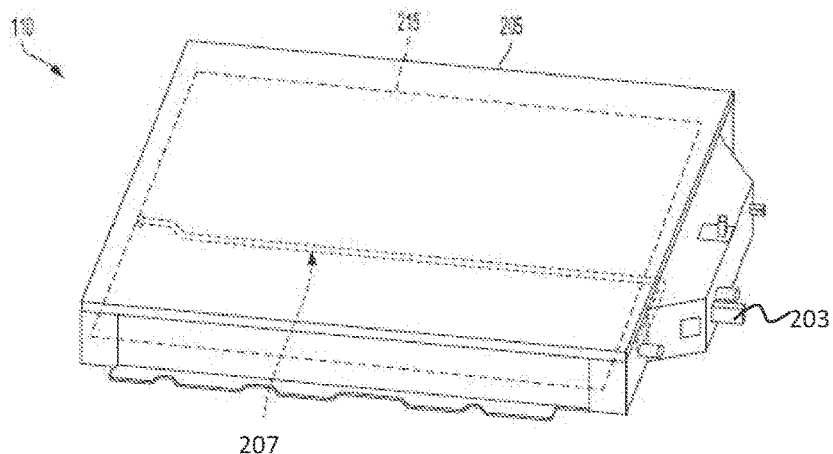
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery subassemblies) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include a battery pack frame 205 (e.g., a battery pack housing or pack frame). For example, the battery pack frame 205 may house or enclose one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the battery pack frame 205, such as by distributing fluid through the battery pack 110.

For example, the thermal control structures 207 may form a part of a thermal/temperature control or heat exchange system that includes one or more thermal components 215 such as plates or bladders that are disposed in thermal contact with one or more battery modules 115 and/or battery cells 120 disposed within the battery pack frame 205. For example, a thermal component 215 may be positioned in contact with one or more battery modules 115, battery units, batteries, and/or battery cells 120 within the battery pack frame 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
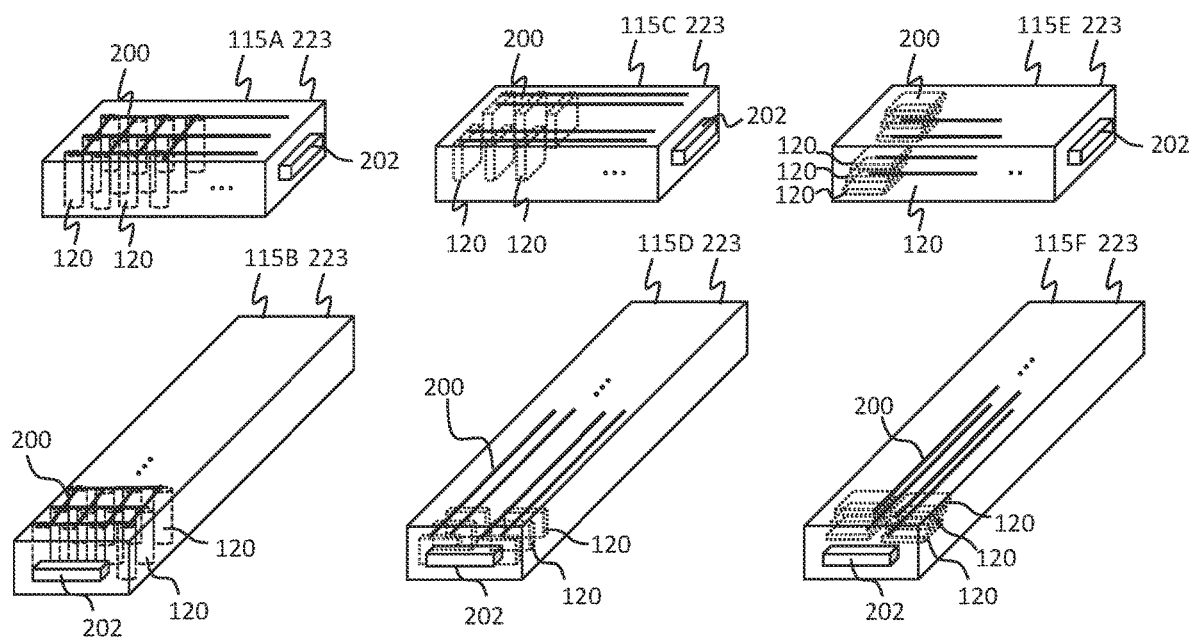
FIG. 2B illustrates schematic perspective views of various battery modules that may be included in a battery pack in accordance with one or more implementations.

FIG. 2B depicts various examples of battery subassemblies (e.g. modules 115) that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

Figure 2C:
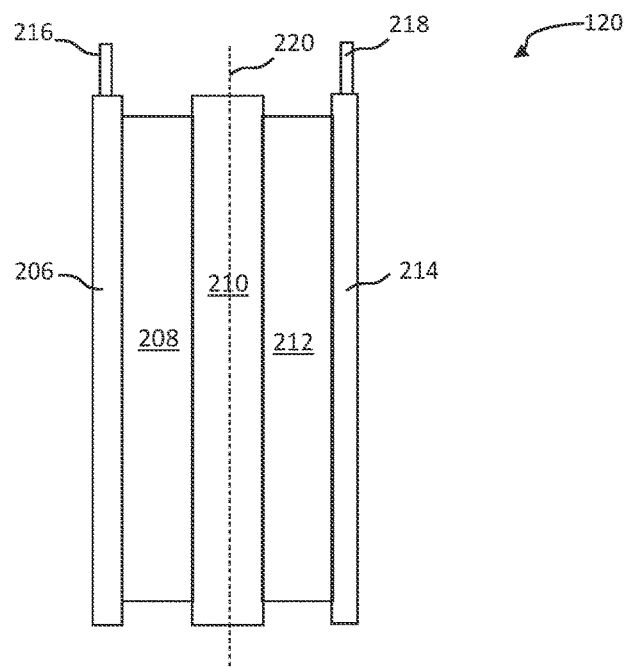
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. The cathode 212 may include an active material composed of a lithium metal phosphate core material having a layer of an ionic conducting material on at least a portion of the core material. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Figure 2D:
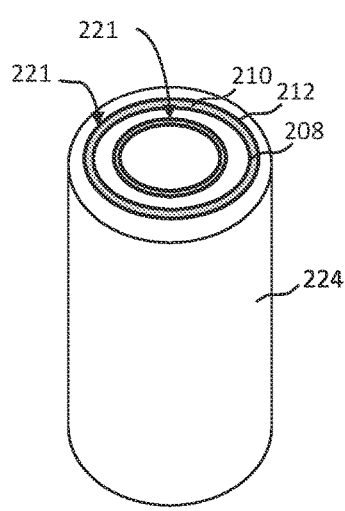
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 224 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 224. For example, a separator layer may be disposed between adjacent ones of the windings 221. However, the cylindrical cell implementation of FIG. 2D is merely illustrative, and other implementations of the battery cells 120 are contemplated.

Figure 2E:
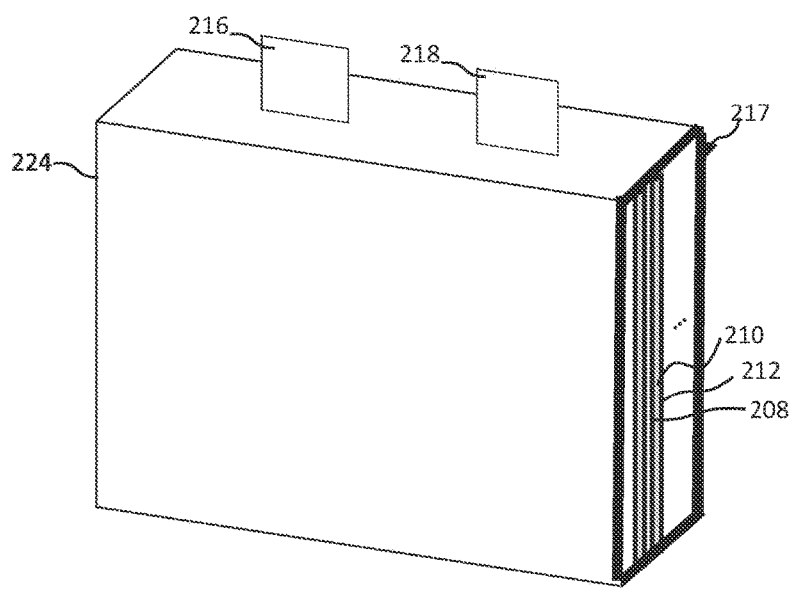
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 224 having a right prismatic outer shape. As shown, one or more layers of the anode 208, the cathode 212, and the electrolyte 210 disposed therebetween may be disposed (e.g., with separator materials between the layers) within the cell housing 224 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 224 having the right prismatic shape. In the implementation of FIG. 2E, the cell housing 224 has a relatively thick cross-sectional width 217 and is formed from a rigid material. For example, the cell housing 224 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 224 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 224 (e.g., a glass to metal feedthrough) as the conductor passes through to cell housing 224 to expose the first terminal 216 and the second terminal 218 outside the cell housing 224 (e.g., for contact with an interconnect structure 200 of FIG. 2B). However, this implementation of FIG. 2E is also illustrative and yet other implementations of the battery cell 120 are contemplated.

Figure 2F:
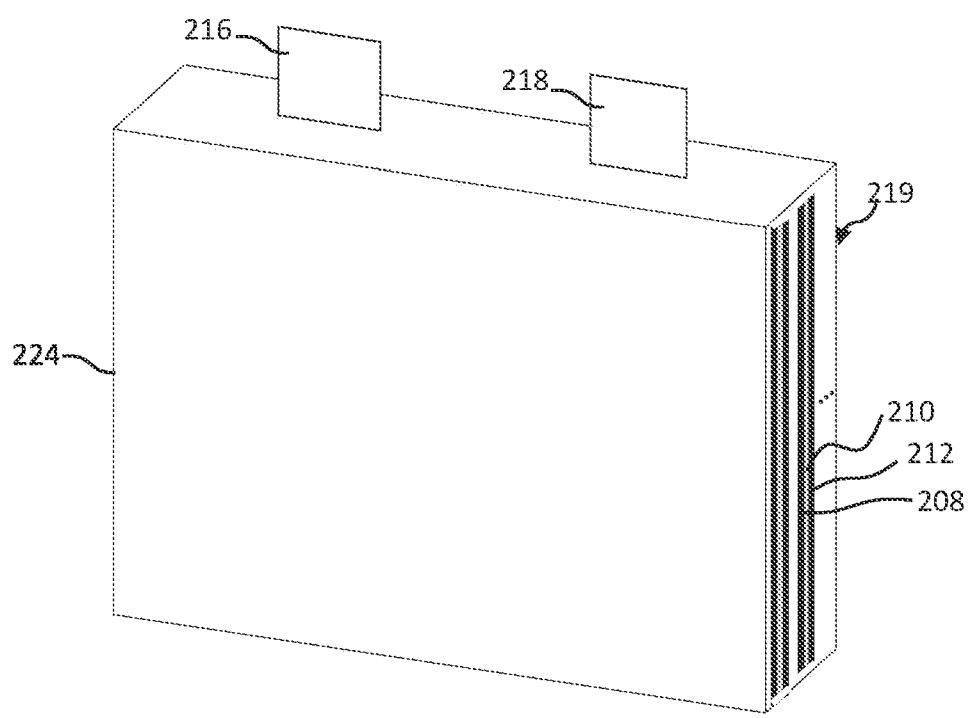
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 224 that forms a flexible or malleable pouch housing. In the implementation of FIG. 2F, the cell housing 224 has a relatively thin cross-sectional width 219.

For example, the cell housing 224 in the implementation of FIG. 2F may be formed from a flexible or malleable material (e.g., a foil, such as a metal foil, or film, such as an aluminum-coated plastic film). For example, the cross-sectional width 219 of the cell housing 224 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 224 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 224 of the battery cell 120 can be disposed in the battery module 115, the battery pack 110, or installed in any of the vehicle 100, the building 180, or any other electrically powered component or device.

Active Materials

As discussed above, a battery cell (e.g., battery cell 120) composed of an electrode (e.g., cathode 212) including an active material of the present disclosure can be used to store and discharge electrical energy and implemented in a building and/or moveable apparatus.

Aspects of the active material of the present disclosure employ lithium metal phosphates. Lithium metal phosphates (LMP), such as lithium iron phosphate (LFP), find use as cathode active materials in battery cells due to their relatively low costs and high cycle life. However, LMP active materials when used alone disadvantageously have relatively low ionic conductivity which may increase charging times of battery cells that contain such active materials.

Aspects of the subject technology described herein relate to active materials that may be used with an electrode of a battery cell, e.g., a cathode electrode, and include a lithium metal phosphate (LMP) core material and a layer of an ionic conducting material on at least a portion of the LMP core material. Advantageously, the ionic conducting material can have a high conductivity to lithium ions relative to the LMP core material. For example, the conductivity of lithium ions of the ionic conducting material is at least one order of magnitude greater, e.g., at least 2, 3, 4, or 5 orders of magnitude greater, than the ionic conductivity of lithium ions of the LMP core material. Including an ionic conducting material on at least a portion of the LMP core material can advantageously increase lithium ion conduction of cathode active material including such materials which can allow fabrication of battery cells with higher charge rates relative to battery cells with the LMP core material without the ionic conducting material.

Useful LMP core materials according to the present disclosure can include, without limitation, lithium iron phosphate, lithium manganese phosphate, lithium iron-manganese phosphate, or any combination of such materials. For example, the LMP core material can include materials of $LiFe_{1-x}M_xPO_4$, where $0 \le x \le 1$, e.g., $0.5 \le x \le 1$, and M comprises one or more of manganese (Mn), nickel (Ni), Aluminum (Al), cobalt (Co), magnesium (Mg), zinc (Zn), or titanium (Ti), etc. In certain aspects, M is Mn.

In some aspects, the LMP core material can have at least about 50 mol % of M (e.g., Mn), such as at least about 70 mol % or 75 mol % of M, and no more than about 50 mol % iron (Fe), such as no more than about 30 mol % or 25 mol % Fe. For example, the LMP core material can have 50-90 mol % of M (e.g., Mn) and 10-50 mol % Fe. In other aspects, the LMP core material can have less than or equal to 90 or 75 mol % of M, or the LMP core material can have less than or equal to 50 or 30 mol % Fe or greater than or equal to 10 or 30 mol % Fe.

As described in further detail hereinafter, the ionic conducting material can have higher conductivity to lithium ions relative to the LMP core material. Useful ionic conducting material can include a compound of Formula (I): $Li_a$-$M'_b$-$P_c$—$O_d$—$(F)_e$, wherein M' is V, Cr, Mn, Fe, Co, Cu, Bi or VCr, Mo, VCr, VMn, VFe, Ti, or W; $0 < a \le 11$, e.g., $1 \le a \le 11$, $1 \le b \le 8$, $1 \le c \le 12$, $4 \le d \le 48$, and $0 \le e \le 2$.

In certain aspects, the ionic conducting material, in addition to having a higher ionic conductivity, can comprise a compound that exhibits a higher voltage (vs. Li/Li+) than the LMP core material. Such compounds may be described by Formula (IA): $Li_a$-$M'_b$-$P_c$—$O_d$—$(F)_e$, wherein M' is V, Cr, Mn, Fe, Co, Cu, Bi or VCr; $0 < a \le 9$, e.g., $1 \le a \le 9$, $1 \le b \le 3$, $1 \le c \le 8$, $4 \le d \le 29$, and $0 \le e \le 1$. Illustrative example ionic conducting material having higher ionic conductivity and higher voltages (vs. Li/Li+) than the LMP core material include, without limitation: $LiV(PO_3)_4$, $LiV_2(PO_4)_3$, $Li_6V_3P_8O_{29}$, $Li_8V_3P_8O_{29}$, $LiCrP_2O_7$, $Li_3Cr_2(PO_4)_3$, $LiCrPO_4F$, $LiFe(PO_3)_4$, $LiFeP_2O_7$, $Li_2FeP_2O_7$, $Li_3Fe_2(PO_4)_3$, $LiFePO_4F$, $LiCoPO_4$, $LiCo(PO_3)_3$, $LiCo(PO_3)_4$, $Li_2VCr(P_2O_7)_2$, $Li_2CuP_2O_7$, $LiBi(PO_3)_4$, or a combination of any two or more thereof.

In other aspects, the ionic conducting material, in addition to having a higher ionic conductivity, can include a compound that exhibits a voltage (vs. Li/Li+) similar to the operating voltage window of the LMP core material, e.g., within about 0.2 volts of the LMP core material. Such compounds may be described by Formula (IB): $Li_a$-$M'_b$-$P_c$—$O_d$—$(F)_e$, wherein M' is V, Fe, Mo, VCr, VMn, VFe; $0 < a \le 11$, e.g., $1 \le a \le 11$, $1 \le b \le 8$, $1 \le c \le 12$, $4 \le d \le 48$, $0 \le e \le 2$. Illustrative ionic conducting material having higher ionic conductivity than and similar voltages (vs. Li/Li+) to the LMP core material include, without limitation: $LiV(PO_3)_4$, $LiV_2(PO_4)_3$, $Li_6V_3P_8O_{29}$, $Li_8V_3P_8O_{29}$, $LiCrP_2O_7$, $Li_3Cr_2(PO_4)_3$, $LiCrPO_4F$, $LiFe(PO_3)_4$, $LiFeP_2O_7$, $Li_2FeP_2O_7$, $Li_3Fe_2(PO_4)_3$, $LiFePO_4F$, $LiCoPO_4$, $LiCo(PO_3)_3$, $LiCo(PO_3)_4$, $Li_2VCr(P_2O_7)_2$, $Li_2CuP_2O_7$, $LiBi(PO_3)_4$, or a combination of any two or more thereof.

In further aspects, the ionic conducting material, in addition to having a higher ionic conductivity, can include a compound that exhibits a lower voltage (vs. Li/Li+) than the LMP core material. Such compounds may be described by Formula (IC): $Li_a$-$M'_b$-$P_c$—$O_d$—$(F)_e$, wherein M' is V, VFe, Ti, Cr, W; $0 < a \le 3$, e.g., $1 \le a \le 3$, $1 \le b \le 4$, $1 \le c \le 3$, $4 \le d \le 12$, and $0 \le e \le 2$. Illustrative example ionic conducting material having higher ionic conductivity and lower voltages (vs. Li/Li+) than the LMP core material include, without limitation: $LiVPO_4F$, $Li_3VFe(PO_4)_2F_2$, $Li_2Ti_2(PO_4)_3$, $LiCr_4(PO_4)_3$, $LiW_2(PO_4)_3$, or a combination of any two or more thereof.

Advantageously, ionic conducting materials having lower voltage (vs. Li/Li$^+$) than the LMP core material can act as sacrificial salts by supplying additional lithium ions to the anode of a battery cell. For example, a battery cell composed of a cathode having a LMP core material with a layer of ionic conducting material on at least a portion thereof in which the ionic conducting material has a higher ionic conductivity and lower voltage (vs. Li/Li$^+$) than the LMP core material can supply donor lithium ions to an anode of the battery cell by applying an activation potential across the anode and cathode to release the lithium ions from the ionic conducting material into the battery cell.

Figure 3C:
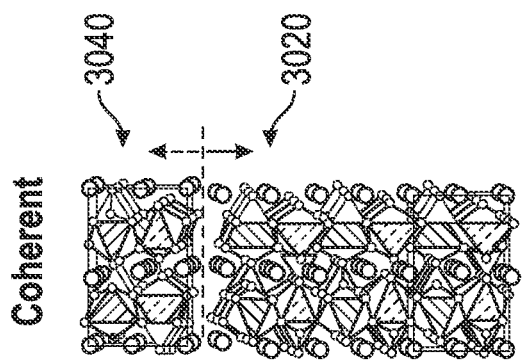
FIGS. 3A, 3B and 3C illustrate LMP core particles having an ionic conducting material thereon in accordance with one or more implementations.
Figure 3B:
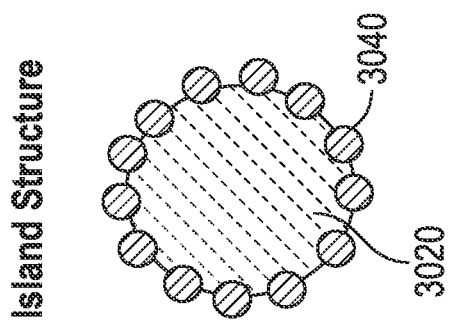
Figure 3A:
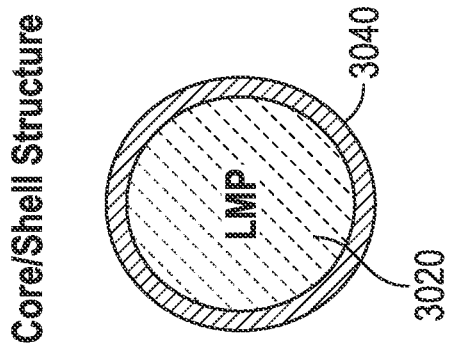

In some aspects, the LMP core material may be in the form of a particle with a layer of the ionic conducting material on at least a portion of the particle and in other aspects the LMP core material may be in the form of a layer on a current collector and the ionic conducting material on at least a portion of such a LMP layer. FIGS. 3A-3C illustrate LMP core particles (3020) having an ionic conducting material (3040) thereon. In one aspect, the ionic conducting material (3040) can form a coating layer on the LMP core particle (3020) such as core/shell structure as illustrated in the FIG. 3A. Alternatively, or in combination, the ionic conducting material (3040) can form a layer only on a portion of the LMP core particle (3020) such as isolated islands on the LMP core particle as illustrated in the FIG. 3B. Further, the morphology of the ionic conducting material (3040) layer may be coherent with the LMP core material (3020) in conducting lithium ions into and out of the LMP particle as shown in FIG. 3C. The ionic conducting material may be crystalline, amorphous or a combination thereof, e.g., semicrystalline. The energy barrier for Li$^+$ ion diffusion generally is lower for amorphous materials.

The cathode active materials of the present disclosure can further include additives to improve one or more of electrochemical performance, reliability, improve fabrication into an electrode, etc. of the active materials. For example, the active materials may be combined with an electrically conductive carbon. Such conductive carbon can include carbon atoms being sp$^2$ hybridized, sp$^3$ hybridized, or combinations thereof. The ratio between sp$^2$ and sp$^3$ type carbons may be determined by preparation methods including choice of carbon precursor materials, heat treatment conditions, etc. Illustrative conductive carbon materials include, without limitation: graphite, a graphene based conductive carbon, carbon black, Super P carbon black material, Ketjen Black, Acetylene Black, carbon nanotubes, such as single-wall carbon nanotubes (SWCNT), multi-wall carbon nanotubes (MWCNT), carbon nanofiber, graphene, or two or more combinations thereof.

Figure 4:
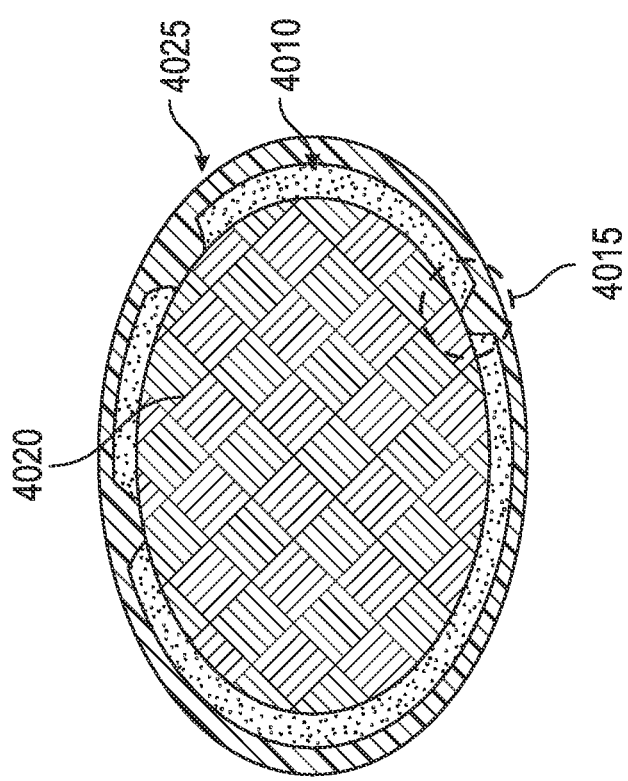
FIG. 4 illustrates another example of an LMP core particle having an ionic conducting material thereon in accordance with one or more implementations.

In some aspects, the active materials of the present disclosure can have a conductive carbon content, based on the total weight of the active material and carbon, of 1.0-3.5 wt. % and any value thereof and therebetween. Illustrative carbon contents include, for example, a carbon content less than or equal to 3.5, 3, 2.5, or 2 wt. % and greater than or equal to 1.0, 1.5, 2, 2.5, or 3 wt. %. The conductive carbon may be on a surface of the active materials of the present disclosure and/or between the LMP core material and ionic conducting material. FIG. 4 illustrates a conductive carbon material between an LMP core particle and an ionic conducting material. In this example, a LMP core material in the form of a particle (4020) has a coating of conductive carbon (4010) on the particle and a coating of ionic conductive material (4025) on the carbon coating (4010). As further illustrated in this example, the ionic conductive material (4025) can directly contact regions of the LMP core material (4020), which is shown by element 4015. In other words for this example, the conductive carbon does not form a complete coating on the LMP core particle such that regions of the LMP particle are available for direct contact with a layer of the ionic conducting material.

Figure 5:
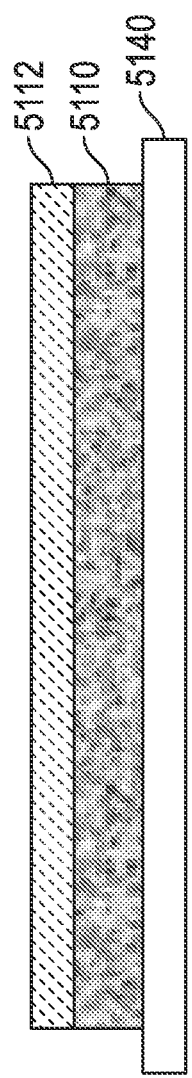
FIG. 5 illustrates an LMP core material having a layer of an ionic conducting material thereon in accordance with one or more implementations.

FIG. 5 illustrates another arrangement of an LMP core material (5110) having a layer of an ionic conducting material (5112) thereon. In this example, the ionic conducting material (5112) forms a layer on a layer of the LMP core material (5110). The LMP core material in turn forms a layer on a current collector (5140). The arrangement illustrated in FIG. 5 can be used as an alternative or in combination with LMP core particles having an ionic conducting material as illustrated in FIGS. 3A-C or FIG. 4.

The cathode active materials disclosed herein may be prepared by a solution based approach. The LMP core materials may be commercially purchased or synthesized via solid state method, solution-based method, sol-gel method, or hydrothermal method, followed by heat treatment (e.g., 400 to 800° C.) in an inert atmosphere or reducing condition using $N_2$, Ar, or $H_2$ gas, or in combination thereof. In a solution based approach, LMP core particles may be added to a mixture for forming an ionic conducting material layer thereon. The ionic conducting material layer may be prepared by combining a lithium source, a phosphorus source and a metal source, i.e., a M' metal source, and optionally a fluoride source. The source components and solvent may be distinct compounds, or alternatively, or in combination, they may be a single compound that functions as a source of multiple components (e.g., acidic solvent such as $H_3PO_4$ can serve as a phosphorus source). The solution and LMP particles are then mixed at a predetermined pH and for a period of time sufficient to form a precipitate of the LMP core particles with a layer of the ionic conducting material or a precursor thereto. The concentration of ionic conducting forming material in solution will affect the amount and extent the ionic conducting material forms a core/shell structure or island structure on the LMP particles. The precipitate is collected and then subjected to an annealing process to form the LMP core material having the ionic conducting material layer thereon. Illustrative lithium source materials include, without limitation: $Li_2CO_3$, $Li_3PO_4$, $LiOH \cdot H_2O$, $LiHCO_3$, or any combination of two or more thereof. Illustrative M' metal sources may be any of the metals, metal oxides, and/or salts of the metals, e.g. phosphate metal salts, sulfate metal salts, halogenated metal salts, e.g., chlorinated metal salts or a combination of any two or more thereof.

Figure 6:
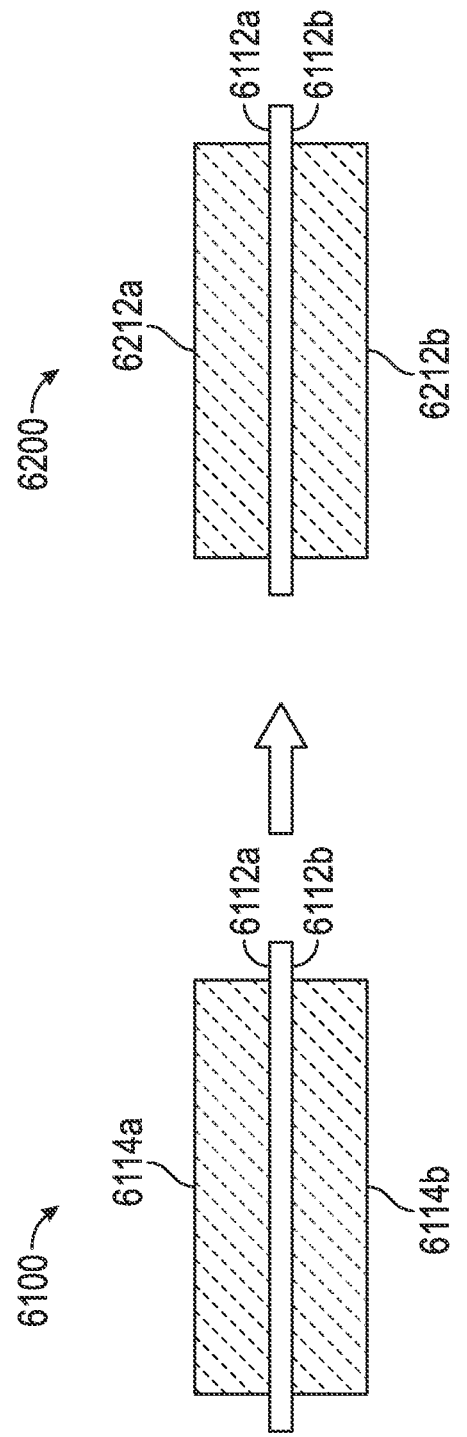
FIG. 6 illustrates an electrode with active materials in accordance with one or more implementations.

The active materials of the present disclosure may be included in an electrode for use in a battery cell. Battery cells can also be referred to as an electrochemical cell. As provided above, an LMP core material having an ionic conducting material on at least a portion of the LMP core material can advantageously increase lithium ion conduction of the cathode active material that includes such ionic conducting material. As such, a battery electrode, e.g., a cathode electrode, may be fabricated with lower area densities than an electrode fabricated with an LMP material without the ionic conducting material. FIG. 6 schematically illustrates an advantage of an electrode with active materials of the present disclosure. As shown, an electrode (6100), e.g., a cathode, can include a current collector having a first principal surface (6112a) and a second principal surface (6112b). Both of the first and second principal surfaces may be coated with an active material of the present disclosure (6114a and 6114b), e.g., an active material comprising a lithium metal phosphate (LMP) core material having a layer of an ionic conducting material on at least a portion of the LMP core material. However, and as illustrated in electrode 6200, the amount of active material (6212a, 6212b) on both the first and second principal surfaces of the current collector (6112a, 6112b) may be reduced (e.g., from electrode 6100 to 6200) due, in part, to the increased conductivity of the active materials.

Such a reductions can allow for an increased rate of charging of the battery cell and/or fabricating cells with smaller dimensions. For example, an areal density (e.g., area density) of each coating on the first (6114a) and the coating on the second (6114b) principal surfaces of the current collector for electrode 6100 may be above 15 mg/cm$^2$, e.g., about 17 mg/cm$^2$, or higher. However, as illustrated with electrode 6200 the coatings (6212a, 6212b) on each of the first and second principal surfaces of the current collector (6112a, 6112b), including active materials of the present disclosure, may be reduced. For example, an areal density of the coating on the first principal surface (6212a) of the current collector is no more than 15 mg/cm$^2$ and an areal density of the coating on the second principal surface (6212b) of the current collector is no more than 15 mg/cm$^2$. In some aspects, loading of active materials on a current collector may be from about 5 mg/cm$^2$ to about 15 mg/cm$^2$ (single-sided) such as from about 3, 5, 7, 9 mg/cm$^2$ to about 15, 13, 12 mg/cm$^2$ (single-sided) and any value therebetween. The areal densities may be determined from dry weight amounts of the components that form the coatings on the current collector prior to charging the cell.

Electrodes including active materials of the present disclosure may be fabricated by initially preparing a slurry of the active materials in a liquid medium with optionally other ingredients such as a binder, conductive carbon, such as those illustrated above (which conductive carbon may be in addition to, or as an alternative to combining particles of the active materials with conductive carbon), etc. The slurries can then be used to coat principal surfaces of current collectors followed by drying. The area densities of the coatings may be determined based on a calculation of the dry weights of the active materials with optional additives over the areas coated.

Useful binders for forming the electrodes include, for example, polyvinylidenefluoride (PVdF), polyvinylpyrrolidone (PVP), styrene-butadiene or styrene-butadiene rubber (SBR), polytetrafluoroethylene (PTFE), carboxymethylcellulose (CMC) or combinations thereof. The current collector can include a metal, such as aluminum, copper, nickel, titanium, stainless steel, or a metal alloy, or a carbonaceous material, or a combination thereof. The current collector material may be in the form of a foil, such as a metal foil and may be coated with a conductive carbon, such as carbon-coated aluminum foil, carbon-coated copper foil, or other carbon-coated foil material.

As provided above, the active materials of the present disclosure may be included in an electrode and implemented in a battery cell. In accordance with aspects of the present disclosure, a battery cell can include an electrode including the active materials disclosed herein, e.g., a lithium metal phosphate (LMP) core material having a layer of an ionic conducting material on at least a portion of the LMP core material. The battery cell can further include a separator and/or electrolyte and an anode, which may be formed in-situ on a current collector, e.g., an anode-free cell. The battery cell can further include a positive and a negative terminal, which may be used to electrically connect a load or charger to the battery cell.

Useful electrolytes can include, without limitation, liquid electrolytes, gel electrolytes, solid electrolytes, etc. Liquid electrolytes can include, without limitations, a salt dissolved in a solvent medium. A wide variety of solvent media may be included with liquid electrolyte of battery cells of the present disclosure such as carbonates, ethers and acetates, for example. In one aspect of the present disclosure, the electrolyte includes one or more carbonate solvents such as dimethyl carbonate (DMC), diethyl carbonate (DEC), and ethyl methyl carbonate (EMC), ethylene carbonate (EC), propylene carbonate (PC), vinylene carbonate (VC), fluoroethylene carbonate (FEC), etc. or mixtures thereof. For lithium ion battery cells, a variety of lithium salts may be added to the electrolyte such as lithium hexafluorophosphate (LiPF$_6$) lithium tetrafluoroborate (LiBF$_4$), lithium perchlorate (LiClO$_4$), lithium hexafluoroarsenate (LiAsF$_6$), lithium triflate (LiSO$_3$CF$_3$), etc., or mixtures thereof.

Useful separators that may be included in a battery cell of the present disclosure may be composed of, without limitation: a polymer such as polyethylene, polypropylene, polyolefin, and/or polyamide, a ceramic, glass, or other insulating materials, or any combination thereof.

Useful anodes that may be included in a battery cell of the present disclosure may be composed of, without limitation: graphitic carbon (e.g., ordered or disordered carbon with sp$^2$ hybridization, artificial or natural graphite, or blends thereof), lithium metal, lithium alloys such as Li—Mg, Li—Al, Li—Ag alloys, a metal oxide, e.g., lithium titanate, silicon, a silicon-based material (e.g., silicon-based carbon composite, oxide, carbide, a pre-lithiated silicon material), etc. or a combination of any two or more thereof.

In some aspects, anodes that may be included in a battery cell in accordance with the present disclosure include an anode that may be formed in situ on a current collector. For example, an electrode can include a current collector (e.g., a metal foil such as a copper foil or carbon foil) with an in situ-formed anode (e.g., Li metal) on a surface of the current collector facing a separator or solid-state electrolyte. In such examples, a battery cell may be configured to lack an anode active material in an uncharged state.

In accordance with aspects of the subject technology, a method of manufacturing a battery is provided, the method including providing a layer of an ionic conducting material (e.g., ionic conducting material 3040) on at least a portion of a lithium metal phosphate (LMP) core material (e.g., LMP core particle 3020), the ionic conducting material having a higher ionic conductivity of lithium ions than the LMP core material. In one or more implementations, providing the layer of the ionic conducting material on at least the portion of the LMP core comprises forming a cathode active material for a cathode of the battery.

In accordance with aspects of the subject technology, a method is provided that includes: obtaining a battery having a cell (e.g., a battery cell 120), the cell including a cathode (e.g., cathode 212), an anode (e.g., anode 208), and an electrolyte (e.g., electrolyte 210), the cathode including an active cathode material including a lithium metal phosphate (LMP) core material (e.g., LMP core particle 3020) having a layer of an ionic conducting material (e.g., ionic conducting material 3040) on at least a portion of the LMP core material, in which the ionic conducting material has a higher ionic conductivity of lithium ions than the LMP core material; charging the cell of the battery, and/or discharging the cell of the battery. Discharging the cell can provide electrical power to a power-consuming component (e.g., a vehicle and/or an electrical system of a building).

As provided in the Examples below, simulations show that the ionically-conductive materials of the present disclosure, as a layer on a LMP core material, can lead to an increase kinetic rate of Li+ ion diffusion and higher charge rates. In an aspect of the present disclosure, a battery cell including an electrode having the active materials disclosed herein may be charged at C-rates of at least 0.5C, 1C, 1.5C, 2C etc. The C-rate as used herein refers to the charge/discharge current divided by the nominally rated battery capacity.

As further provided by the Examples below, a battery cell including an electrode having an active material disclosed herein can form a cathode-electrolyte interphase (CEI) layer. Such a CEI layer can facilitate passivation of the active materials.

EXAMPLES

The following examples are intended to further illustrate certain aspects of the subject technology and are not limiting in nature. Those skilled in the art will recognize, or be able to ascertain, using no more than routine experimentation, numerous equivalents to the specific substances and procedures described herein.

General. First-principles density functional theory (DFT)-based methodologies may be used to determine, understand, and pre-select materials exhibiting the desired properties to initially identify stable, ionically conductive materials described herein. DFT-based methodologies may be used to calculate total energies of elements in their lowest energy bulk structures and predict superionic character of stable of Li-M-P—O materials. The DFT algorithms may be used to also determine the electrochemical properties such as average voltage ($\bar{V}$) of $Li_xMX$ between $x_1$ and $x_2$ by using the Gibbs free energy ($\Delta G$) obtained from the internal DFT energy (E) calculations according to the following equation:

$$\bar{V} = -\frac{\Delta G}{(x_2 - x_1)ne} \approx -\frac{E_{Li_{x_2}MX} - E_{Li_{x_1}MX} - nE_{Li}}{(x_2 - x_1)ne}$$

Example 1. High voltage, stable compounds during normal cell operation (Type I compounds), Using DFT, a list of Li-M-P—O—(F) compounds were identified that exhibit a voltage (versus the Li/Li+) higher than a LMP core material as well as higher ionic conductivity of lithium ions than the LMP core material. Table 1A and Table 1B below provide a listing of such compounds relative a $LiFePO_4$ or a $LiMnPO_4$ core reference material, respectively.

TABLE 1A

Stable compound that exhibit a higher voltage (versus the Li/Li+) and higher ionic conductivity to lithium ions than a core $LiFePO_4$ material.

| Generic Formula | Formula | Conductivity (S/cm) | Voltage (vs. Li/Li$^+$) |
| --- | --- | --- | --- |
| Li—V—P—O | $LiV(PO_3)_4$ | $1.842 \times 10^{-7}$ | 4.71 |
| | $LiV_2(PO_4)_3$ | $1.682 \times 10^{-8}$ | 4.11 |
| | $Li_6V_3P_8O_{29}$ | $1.217 \times 10^{-9}$ | 4.42 |
| | $Li_8V_3P_8O_{29}$ | $6.374 \times 10^{-8}$ | 4.16 |
| Li—Cr—P—O—(F) | $LiCrP_2O_7$ | $3.306 \times 10^{-8}$ | 4.69 |
| | $Li_3Cr_2(PO_4)_3$ | $6.167 \times 10^{-7}$ | 4.44 |
| | $LiCrPO_4F$ | $2.229 \times 10^{-8}$ | 4.36 |
| Li—Mn—P—O—(F) | $LiMn(PO_3)_4$ | $7.603 \times 10^{-7}$ | 4.94 |
| | $Li_3Mn_3(PO_4)_4$ | $1.763 \times 10^{-6}$ | 4.82 |
| | $Li_9Mn_3P_8O_{29}$ | $3.973 \times 10^{-7}$ | 5.63 |
| | $LiMnPO_4F$ | $1.263 \times 10^{-6}$ | 4.54 |
| Core Reference | $LiFePO_4$ | $4.452 \times 10^{-11}$ | 3.40 |

TABLE 1B

Stable compound that exhibit a higher voltage (versus the Li/Li+) and higher ionic conductivity to lithium ions than a core $LiMnPO_4$ material.

| Generic Formula | Formula | Conductivity (S/cm) | Voltage (vs. Li/Li$^+$) |
| --- | --- | --- | --- |
| Li—Fe—P—O—(F) | $LiFe(PO_3)_4$ | $3.387 \times 10^{-9}$ | 4.67 |
| | $LiFeP_2O_7$ | $1.078 \times 10^{-8}$ | 5.05 |
| | $Li_2FeP_2O_7$ | $2.165 \times 10^{-10}$ | 4.10 |
| | $Li_3Fe_2(PO_4)_3$ | $3.051 \times 10^{-10}$ | 4.76 |
| | $LiFePO_4F$ | $2.521 \times 10^{-8}$ | 4.87 |
| Li—Co—P—O | $LiCoPO_4$ | $3.636 \times 10^{-7}$ | 4.24 |
| | $LiCo(PO_3)_3$ | $5.335 \times 10^{-7}$ | 5.25 |
| | $LiCo(PO_3)_4$ | $7.265 \times 10^{-7}$ | 6.19 |
| Others | $Li_2VCr(P_2O_7)_2$ | $3.959 \times 10^{-9}$ | 3.94 |
| | $Li_2CuP_2O_7$ | $3.233 \times 10^{-9}$ | 4.60 |
| | $LiBi(PO_3)_4$ | $1.127 \times 10^{-10}$ | 5.65 |
| Core Reference | $LiMnPO_4$ | $6.134 \times 10^{-11}$ | 3.82 |

As shown in Tables 1A and 1B above, the ionic conductivity of lithium ions of the ionic conducting material is at least 2, 3, 4, or 5 orders of magnitude greater than the ionic conductivity of lithium ions of the core material. The ionic conducting materials of Tables 1A and 1B include compounds within Formula (IA), which is described fully above.

Example 2. Stable compounds having similar operating voltage (Type II compounds). Using DFT, a list of Li-M-P—O—(F) compounds were identified that while having high lithium ionic conductivity also exhibit a similar operating voltage window (versus the Li/Li$^+$) relative the LMP core material. Table 2 below provides a listing of such compounds relative a $LiFePO_4$ core or a core $LiMnPO_4$ reference material.

TABLE 2

Stable compound that exhibit a similar operating voltage window (versus the Li/Li+) and higher ionic conductivity to lithium ions than a core LMP material.

| Generic Formula | Formula | Conductivity (S/cm) | Voltage (vs. Li/Li$^+$) | (De-lithiation Reaction | De-lithiated host stability (eV)[1] |
| --- | --- | --- | --- | --- | --- |
| Li—V—PO | $LiVPO_5$ | $2.985 \times 10^{-8}$ | 3.66 | $LiVPO_5$ <-> $VPO_4 + Li$ | $-3.50\ \mu_{O2}$ |
| | $LiVP_2O_7$ | $1.365 \times 10^{-6}$ | 3.87 | $LiVP_2O_7$ <-> $VP_2O_7 + Li$ | $-4.55\ \mu_{O2}$ |

TABLE 2-continued

Stable compound that exhibit a similar operating voltage window (versus the Li/Li+) and higher ionic conductivity to lithium ions than a core LMP material.

| Generic Formula | Formula | Conductivity (S/cm) | Voltage (vs. Li/Li$^+$) | (De-lithiation Reaction) | De-lithiated host stability (eV)[1] |
|---|---|---|---|---|---|
| | $Li_3V_2(PO_4)_3$ | $3.923 \times 10^{-6}$ | 3.32 | $Li_3V_2(PO_4)_3$ <-> $LiV_2(PO_4)_3$ + 2Li | $-8.12\ \mu_{O2}$ |
| | $Li_{11}V_8(PO_4)_{12}$ | $1.034 \times 10^{-8}$ | 3.32 | $Li_{11}V_8(PO_4)_{12}$ <-> $Li_3V_8(PO_4)_{12}$ + 8Li | $-8.12\ \mu_{O2}$ |
| Li—Fe—PO | $LiFe_2P_3O_{10}$ | $2.165 \times 10^{-10}$ | 3.76 | $LiFe_2P_3O_{10}$ <-> $Fe_2P_3O_{10}$ + Li | $-5.65\ \mu_{O2}$ |
| Li—Mo—PO | $LiMo_2(PO_4)_3$ | $9.296 \times 10^{-8}$ | 3.23 | $LiMo_2(PO_4)_3$ <-> $Mo_2(PO_4)_3$ + Li | $-4.60\ \mu_{O2}$ |
| | $Li_3Mo_2(PO_4)_3$ | $3.689 \times 10^{-10}$ | 3.23 | $Li_3Mo_2(PO_4)_3$ <-> $Mo_2(PO_4)_3$ + 3Li | $-4.60\ \mu_{O2}$ |
| Li—V—M—PO | $Li_2VCr(PO_4)_2F_2$ | $5.358 \times 10^{-8}$ | 3.81 | $Li_2VCr(PO_4)_2F_2$ <-> $LiVCr(PO_4)_2F_2$ + Li | Stable |
| | $Li_2VMn(PO_4)_2F_2$ | $4.727 \times 10^{-7}$ | 3.70 | $Li_2VMn(PO_4)_2F_2$ <-> $LiVMn(PO_4)_2F_2$ + Li | *$-3.80\ \mu_{O2}$* |
| | $Li_3VMn(P_2O_7)_2$ | $1.435 \times 10^{-9}$ | 3.57 | $Li_3MnV(P_2O_7)_2$ <-> $Li_2MnV(P_2O_7)_2$ + Li | *$-3.20\ \mu_{O2}$* |
| | $Li_2VFe(P_2O7)_2$ | $1.705 \times 10^{-5}$ | 3.87 | $Li_2VFe(P_2O7)_2$ <-> $LiVFe(P_2O7)_2$ + Li | $-6.78\ \mu_{O2}$ |
| Core | $LiFePO_4$ | $4.452 \times 10^{-11}$ | 3.40 | $LiFePO_4$ <-> $FePO_4$ + Li | $-4.48\ \mu_{O2}$ (600° C.) |
| Reference | $LiMnPO_4$ | $6.134 \times 10^{-11}$ | 3.82 | $LiMnPO_4$ <-> $MnPO_4$ + Li | $-2.54\ \mu_{O2}$ (330° C.) |

$\mu_{O2}$ are italicized and indicate that the stability of these materials is expected to be less than the 600° C. thermal stability of $LiFePO_4$ but higher than the 330° C. thermal stability of $LiMnPO_4$.

As shown in Table 2 above, the ionic conductivity of lithium ions of the ionic conducting material is at least 2, 3, 4, or 5 orders of magnitude greater than the ionic conductivity of lithium ions of the core material. The ionic conducting materials of Table 2 include compounds within Formula (IB), which is described fully above. Certain of such compounds can provide additional lithium ions to a negative electrode (e.g., an anode), particularly when the ionic conducting material has a voltage lower than the voltage of the core material. As further shown in Table 2 above, the de-lithiated host structures are confirmed to have comparable or higher stability than a LMP core material.

Example 3. Low voltage, stable compounds during normal cell operation (Type III compounds). Using DFT, a list of Li-M-P—O—(F) compounds were identified that exhibit a voltage (vs. Li/Li$^+$) lower and higher ionic conductivity of lithium ions than a core material. Table 3 below provides a listing of such compounds relative a $LiFePO_4$ core or a core $LiMnPO_4$ reference material.

TABLE 3

Stable compound that exhibit a lower voltage (versus the Li/Li+) and higher ionic conductivity to lithium ions than a core LMP material.

| Generic Formulae | Formula | Conductivity (S/cm) | Voltage (vs. Li/Li$^+$) | (De-lithiation Reaction) | De-lithiated host stability (eV) |
|---|---|---|---|---|---|
| Li—V—P—O—F | $LiVPO_4F$ | $3.072 \times 10^{-7}$ | 2.55 | $LiVPO_4F$ -> $VPO_4F$ + Li | $-8.08\ \mu_{O2}$ |

TABLE 3-continued

Stable compound that exhibit a lower voltage (versus the Li/Li+) and higher ionic conductivity to lithium ions than a core LMP material.

| Generic Formulae | Formula | Conductivity (S/cm) | Voltage (vs. Li/Li+) | (De-lithiation Reaction) | De-lithiated host stability (eV) |
|---|---|---|---|---|---|
|  | $Li_3VFe(PO_4)_2F_2$ | $8.925 \times 10^{-7}$ | 2.72 | $Li_3VFe(PO_4)_2F_2$ -> $LiVFe(PO_4)_2F_2$ + 2Li | $-5.68\ \mu_{O2}$ |
| Others | $Li_2Ti_2(PO_4)_3$ | $6.003 \times 10^{-7}$ | 2.14 | $Li_2Ti_2(PO_4)_3$ -> $LiTi_2(PO_4)_3$ + Li | $-8.59\ \mu_{O2}$ |
|  | $LiCr_4(PO_4)_3$ | $4.538 \times 10^{-7}$ | 2.26 | $LiCr_4(PO_4)_3$ -> $Cr_4(PO_4)_3$ + Li | $-7.41\ \mu_{O2}$ |
|  | $LiW_2(PO_4)_3$ | $4.640 \times 10^{-7}$ | 2.93 | $LiW_2(PO_4)_3$ -> $W_2(PO_4)_3$ + Li | $-7.53\ \mu_{O2}$ |
| Reference | $LiFePO_4$ | $4.452 \times 10^{-11}$ | 3.40 | $LiFePO_4$ <-> $FePO_4$ + Li | $-4.48\ \mu_{O2}$ (600° C.) |
|  | $LiMnPO_4$ | $6.134 \times 10^{-11}$ | 3.82 | $LiMnPO_4$ <-> $MnPO_4$ + Li | $-2.54\ \mu_{O2}$ (330° C.) |

As shown in Table 3 above, the ionic conductivity of lithium ions of the ionic conducting material is at least 2, 3, or 4 orders of magnitude greater than the ionic conductivity of lithium ions of the core material. As further shown in Table 3 above, the de-lithiated host structures are confirmed to have higher stability than the LMP core material. The ionic conducting materials of Table 3 include compounds within Formula (IC), which is described fully above.

The ionic conducting materials in this example, however, have significantly lower voltages than the core LMP material. Thus, such ionic conducting materials may supply donor lithium ions to a negative electrode (e.g., an anode) when applying an activation potential across the positive and negative electrodes a battery cell that includes a cathode electrode having an active material that is composed of such ionic conducting materials on an LMP core material.

Thus, such ionic conducting materials may supply donor lithium ions to a negative electrode (e.g., an anode) under certain operations. For example, when a battery cell includes a cathode electrode having an active material that is composed of such ionic conducting materials (e.g., one or more compounds with lower voltage than the LMP core) as a layer on at least a portion of the LMP core material and an activation potential is applied across the anode electrode and cathode electrode of the battery cell, the ionic conducting material releases additional lithium donor ions into the battery cell, which accumulate on the anode. In this way, the ionic materials having lower voltages may act as sacrificial salts.

Example 4. HF Reaction with Certain Ionic Conducting Materials. Certain lithium salts in liquid electrolytes systems contain or undergo decomposition during battery operations to form hydrofluoric acid (HF). For example, lithium hexafluorophosphate ($LiPF_6$) may contain trace HF and may decompose to HF. Using DFT, reactivities of certain ionic conducting materials of the present disclosure with HF were investigated and the results provided in Tables 4A and 4B below.

| De-lithiated Compounds | HF Reaction |
|---|---|
| $VPO_4$ | $0.923\ HF + 0.077\ VPO_4 \rightarrow 0.308\ H_3OF + 0.077\ PF_5 + 0.077\ VF_3$ |
| $VP_2O_7$ | $0.955\ HF + 0.045\ VP_2O_7 \rightarrow 0.318\ H_3OF + 0.045\ VF_4 + 0.091\ PF_5$ |
| $LiV_2(PO_4)_3$ | $0.973\ HF + 0.027\ LiV_2(PO_4)_3 \rightarrow 0.324\ H_3OF + 0.027\ LiPF_6 + 0.054\ VF_4 + 0.054\ PF_5$ |
| $Li_3V_8(PO_4)_{12}$ | $0.993\ HF + 0.007\ Li_3V_8(PO_4)_{12} \rightarrow 0.007\ LiVF_6 + 0.331\ H_3OF + 0.014\ LiPF_6 + 0.048\ VF_4 + 0.069\ PF_5$ |
| $Fe_2P_3O_{10}$ | $0.6\ HF + 0.4\ Fe_2P_3O_{10} \rightarrow 0.2\ Fe_2P_3(O_3F)_3 + 0.2\ H_3PO_4 + 0.2\ Fe_2P_2O_7$ |
| $Mo_2(PO_4)_3$ | $0.978\ HF + 0.022\ Mo_2(PO_4)_3 \rightarrow 0.022\ MoOF_4 + 0.244\ H_4OF_2 + 0.067\ PF_5 + 0.022\ MoF_3$ |
| $LiVCr(PO_4)_2F_2$ | $0.96\ HF + 0.04\ LiVCr(PO_4)_2F_2 \rightarrow 0.32\ H_3OF + 0.04\ VF_4 + 0.04\ LiPF_6 + 0.04\ PF_5 + 0.04\ CrF_3$ |
| $LiVMn(PO_4)_2F_2$ | $0.04\ LiMnVP_2(O_4)F_2 + 0.96\ HF \rightarrow 0.04\ LiPF_6 + 0.32\ H_3OF + 0.04\ VF_4 + 0.04\ MnF_3 + 0.04\ PF_5$ |
| $Li_2MnV(P_2O_7)_2$ | $0.023\ Li_2MnV(P_2O_7)_2 + 0.977\ HF \rightarrow 0.047\ LiPF_6 + 0.326\ H_3OF + 0.023\ MnF_3 + 0.047\ PF_5 + 0.023\ VF_3$ |
| $LiVFe(P_2O_7)_2$ | $0.977\ HF + 0.023\ LiVFe(P_2O_7)_2 \rightarrow 0.023\ VF_4 + 0.07\ PF_5 + 0.023\ LiPF_6 + 0.326\ H_3OF + 0.023\ FeF_3$ |
| $VPO_4F$ | $0.941\ HF + 0.059\ VPO_4F \rightarrow 0.059\ VF_4 + 0.235\ H_4OF_2 + 0.059\ PF_5$ |
| $LiVFe(PO_4)_2F_2$ | $0.96\ HF + 0.04\ LiVFeP_2(O_4F)_2 \rightarrow 0.04\ VF_4 + 0.04\ PF_5 + 0.04\ LiPF_6 + 0.32\ H_3OF + 0.04\ FeF_3$ |
| $LiTi_2(PO_4)_3$ | $0.973\ HF + 0.027\ LiTi_2(PO_4)_3 \rightarrow 0.324\ H_3OF + 0.054\ PF_5 + 0.027\ LiPF_6 + 0.054\ TiF_4$ |
| $Cr_4(PO_4)_3$ | $0.929\ HF + 0.071\ Cr_4(PO_4)_3 \rightarrow 0.179\ PH_3O_4 + 0.016\ CrP_2 + 0.13\ H_3OF + 0.266\ CrF_3$ |
| $W_2(PO_4)_3$ | $0.02\ P_3(WO_6)_2 + 0.98\ HF \rightarrow 0.245\ H_4OF_2 + 0.031\ WF_6 + 0.061\ PF_5 + 0.01\ W$ |

As shown by Tables 4A and 4B above, ionic conducting materials of the present disclosure may undergo reaction with HF. The reaction products with HF may facilitate formation of a passivating layer such as an cathode-electrolyte interphase (CEI) layer on the active materials of the present disclosure.

Figure 7:
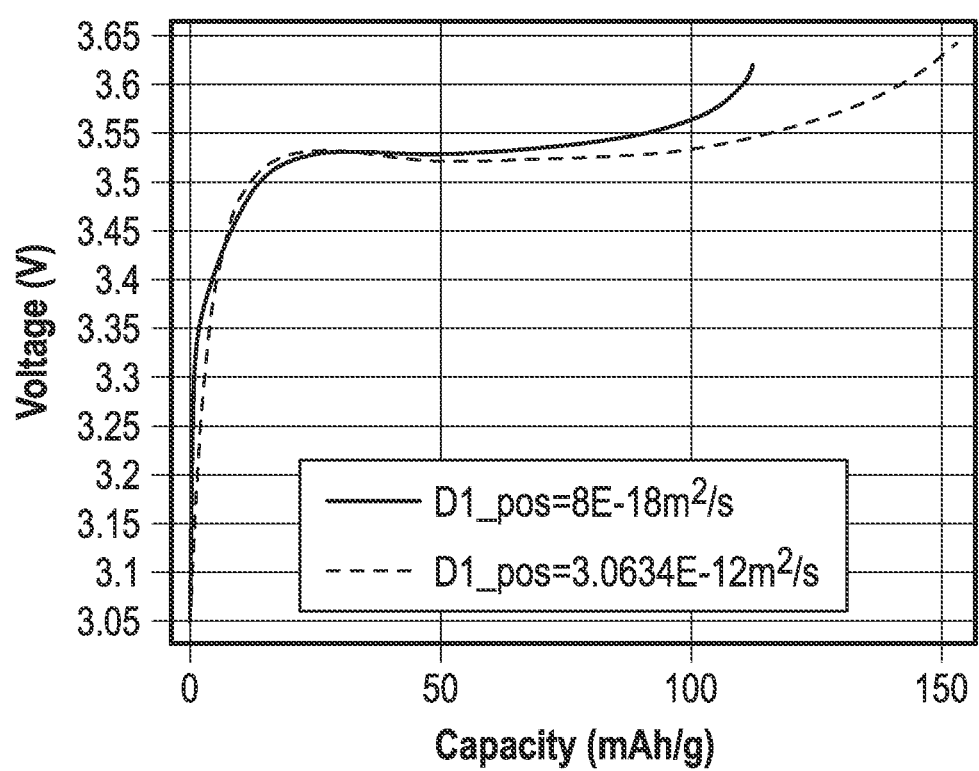
FIG. 7 is a plot of voltage versus capacity comparing a cathode active material composed of a lithium metal phosphate alone to a cathode active materials composed of the core material with an ionic conducting layer according to aspects of the present disclosure.

Example 5. Nernst-Einstein relationship was used to convert the ionic conductivity to diffusivity (D). A diffusion simulation of lithium ion ($Li^+$) at the cathode surface during a 2C charge rate shows cathode active materials of the present disclosure would have comparable and better charge characteristic compared to a core LMP material alone. For example, FIG. 7 shows a plot of voltage versus capacity for a cathode active materials composed of a $LiFePO_4$ core material alone (diffusivity of D1=8E−18 $m^2/s$) compared to a cathode active materials composed of the core material with an ionic conducting layer of the present disclosure (diffusivity of D1=3.0634E−12 $m^2/s$). The simulation further shows that an ionically-conductive materials of the present disclosure as a layer or coating in a cathode leads to an increase of $Li^+$ ion diffusion kinetic rate and faster $Li^+$ kinetics affects the utilization such that more of the cathode active material area may be utilized at high charging (C-rates), e.g., C-rates of at least 0.5C, 1C, 1.5C, 2C etc.

Aspects of the subject technology can help improve the operation and implementation of battery cells. For example, battery cells having active materials of the present disclosure can reduce charge times, enhance efficiency and utilization of batteries. Reduced charge rates further allows designs of smaller batteries which reduces weight and the amount of materials needed for a particular use, all of which can help to mitigate climate change by reducing and/or preventing additional greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, the term "coupled" or the like may refer to being directly coupled. In another aspect, the term "coupled" or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it may be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A cathode active material, comprising:
   particles having a lithium metal phosphate (LMP) core material; a layer of an ionic conducting material on at least a portion of the LMP core material and a conductive carbon material between the LMP core material and the layer of the ionic conducting material;
   wherein the ionic conducting material has a higher ionic conductivity of lithium ions than the LMP core material.

2. The cathode active material of claim 1, wherein the LMP core material comprises $LiMPO_4$, wherein M comprises one or more of iron (Fe), manganese (Mn), nickel (Ni), Aluminum (Al), cobalt (Co), magnesium (Mg), zinc (Zn), or titanium (Ti).

3. The cathode active material of claim 1, wherein the ionic conducting material comprises one or more compounds of formula: $Li_a\text{-}M'_b\text{-}P_c\text{—}O_d\text{—}(F)_e$, wherein M' is V, Cr, Mn, Fe, Co, Cu, Bi or VCr, Mo, VCr, VMn, VFe, Ti, or W; and $0<a\leq11$, $1\leq b\leq8$, $1\leq c\leq12$, $4\leq d\leq48$, and $0\leq e\leq2$.

4. The cathode active material of claim 1, wherein the ionic conducting material comprises: $LiV(PO_3)_4$, $LiV_2(PO_4)_3$, $Li_6V_3P_8O_{29}$, $Li_8V_3P_8O_{29}$, $LiCrP_2O_7$, $Li_3Cr_2(PO_4)_3$, $LiCrPO_4F$, $LiFe(PO_3)_4$, $LiFeP_2O_7$, $Li_2FeP_2O_7$, $Li_3Fe_2(PO_4)_3$, $LiFePO_4F$, $LiCoPO_4$, $LiCo(PO_3)_3$, $LiCo(PO_3)_4$, $Li_2VCr(P_2O_7)_2$, $Li_2CuP_2O_7$, $LiBi(PO_3)_4$, or a combination of any two or more thereof.

5. The cathode active material of claim 1, wherein the ionic conducting material comprises: $LiVPO_5$, $LiVP_2O_7$, $Li_3V_2(PO_4)_3$, $Li_{11}V_8(PO_4)_{12}$, $LiFe_2P_3O_{10}$, $Li_2VCr(PO_4)_2F_2$, $Li_2VMn(PO_4)_2F_2$, $Li_3VMn(P_2O_7)_2$, $Li_2VFe(P_2O_7)_2$, or a combination of any two or more thereof.

6. The cathode active material of claim 1, wherein the ionic conducting material comprises: $LiVPO_4F$, $Li_3VFe(PO_4)_2F_2$, $Li_2Ti_2(PO_4)_3$, $LiCr_4(PO_4)_3$, $LiW_2(PO_4)_3$, or a combination of any two or more thereof.

7. The cathode active material of claim 1, wherein the ionic conductivity of lithium ions of the ionic conducting material is at least one order of magnitude greater than the ionic conductivity of lithium ions of the core material.

8. The cathode active material of claim 1, wherein the ionic conducting material comprises a lithium vanadium iron phosphate.

9. An electrode, comprising: a current collector having a first principal surface and a second principal surface; a coating on the first principal surface and a coating on the second principal surface of the current collector; wherein the coating includes an active material comprising particles having a lithium metal phosphate (LMP) core material, a layer of an ionic conducting material on at least a portion of the LMP core material, and a conductive carbon material between the LMP core material and the layer of the ionic conducting material; wherein the ionic conducting material has a higher ionic conductivity of lithium ions than the LMP core material; and wherein an areal density of the coating on the first principal surface is no more than 15 mg/cm² and an areal density of the coating on the second principal surface is no more than 15 mg/cm².

10. The electrode of claim 9, wherein the LMP core material comprises $LiMPO_4$, wherein M comprises one or more of iron (Fe), manganese (Mn), nickel (Ni), Aluminum (Al), cobalt (Co), magnesium (Mg), zinc (Zn), or titanium (Ti).

11. The electrode of claim 9, wherein the ionic conducting material comprises one or more compounds of formula: $L_a\text{-}M'_b\text{-}P_c\text{—}O_d\text{—}(F)_e$, wherein M' is V, Cr, Mn, Fe, Co, Cu, Bi or VCr, Mo, VCr, VMn, VFe, Ti, or W; and $0<a\leq11$, $1\leq b\leq8$, $1\leq c\leq12$, $4\leq d\leq48$, and $0\leq e\leq2$.

12. The electrode of claim 9, wherein the ionic conducting material comprises: $LiV(PO_3)_4$, $LiV_2(PO_4)_3$, $Li_6V_3P_8O_{29}$, $Li_8V_3P_8O_{29}$, $LiCrP_2O_7$, $Li_3Cr_2(PO_4)_3$, $LiCrPO_4F$, $LiFe(PO_3)_4$, $LiFeP_2O_7$, $Li_2FeP_2O_7$, $Li_3Fe_2(PO_4)_3$, $LiFePO_4F$, $LiCoPO_4$, $LiCo(PO_3)_3$, $LiCo(PO_3)_4$, $Li_2VCr(P_2O_7)_2$, $Li_2CuP_2O_7$, $LiBi(PO_3)_4$, or a combination of any two or more thereof.

13. The electrode of claim 9, wherein the ionic conducting material comprises: $LiVPO_5$, $LiVP_2O_7$, $Li_3V_2(PO_4)_3$, $Li_{11}V_8(PO_4)_{12}$, $LiFe_2P_3O_{10}$, $Li_2VCr(PO_4)_2F_2$, $Li_2VMn(PO_4)_2F_2$, $Li_3VMn(P_2O_7)_2$, $Li_2VFe(P_2O_7)_2$, or a combination of any two or more thereof.

14. The electrode of claim 9, wherein the ionic conducting material comprises: $LiVPO_4F$, $Li_3VFe(PO_4)_2F_2$, $Li_2Ti_2(PO_4)_3$, $LiCr_4(PO_4)_3$, $LiW_2(PO_4)_3$, or a combination of any two or more thereof.

15. The electrode of claim 9, wherein the ionic conductivity of lithium ions of the ionic conducting material is at least one order of magnitude greater than the ionic conductivity of lithium ions of the core material.

16. A battery cell, comprising:
   an electrode including an active material comprising particles having a lithium metal phosphate (LMP) core material having a layer of an ionic conducting material on at least a portion of the LMP core material and a conductive carbon material between the LMP core material and the layer of the ionic conducting material; wherein the ionic conducting material has a higher ionic conductivity of lithium ions than the LMP core material.

17. The battery cell of claim 16, further comprising an anode that comprises graphite, silicon, a metal oxide, or a combination of any two or more thereof.

18. The battery cell of claim 16, wherein the LMP core material comprises $LiMPO_4$, wherein M comprises one or more of iron (Fe), manganese (Mn), nickel (Ni), Aluminum (Al), cobalt (Co), magnesium (Mg), zinc (Zn), or titanium (Ti).

19. The battery cell of claim 16, wherein the ionic conducting material comprises one or more compounds of formula: $L_a\text{-}M'_b\text{-}P_c\text{—}O_d\text{—}(F)_e$, wherein M' is V, Cr, Mn, Fe, Co, Cu, Bi or VCr, Mo, VCr, VMn, VFe, Ti, or W; and $0<a\leq 11$, $1\leq b\leq 8$, $1\leq c\leq 12$, $4\leq d\leq 48$, and $0\leq e\leq 2$.

20. A vehicle comprising the battery cell of claim 16.

* * * * *